(12) United States Patent
Iida et al.

(10) Patent No.: US 8,517,415 B2
(45) Date of Patent: Aug. 27, 2013

(54) AIRBAG APPARATUS

(75) Inventors: Hitoshi Iida, Kiyosu (JP); Nobuaki Okamura, Kiyosu (JP); Mikine Hayashi, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 48 days.

(21) Appl. No.: 13/241,597

(22) Filed: Sep. 23, 2011

(65) Prior Publication Data

US 2012/0074672 A1 Mar. 29, 2012

(30) Foreign Application Priority Data

Sep. 29, 2010 (JP) ................................. 2010-218645

(51) Int. Cl.
*B60R 21/215* (2011.01)
*B60R 21/237* (2006.01)

(52) U.S. Cl.
USPC ..................................... 280/728.3; 280/743.1

(58) Field of Classification Search
USPC .......................... 280/728.2, 728.3, 731, 743.1
See application file for complete search history.

(56) References Cited

U.S. PATENT DOCUMENTS

| 5,678,851 | A  | * | 10/1997 | Saito et al. ............... | 280/728.3 |
| 5,913,534 | A  | * | 6/1999  | Klingauf .................. | 280/728.3 |
| 6,022,046 | A  | * | 2/2000  | Isomura et al. ............ | 280/743.2 |
| 6,042,144 | A  |   | 3/2000  | Murakami et al. | |
| 6,142,510 | A  | * | 11/2000 | Endo et al. ................ | 280/731 |
| 6,264,237 | B1 | * | 7/2001  | Terada ..................... | 280/743.1 |
| 6,352,284 | B1 | * | 3/2002  | Okada et al. .............. | 280/743.1 |
| 6,371,509 | B1 | * | 4/2002  | Ellerbrok et al. .......... | 280/729 |
| 6,547,279 | B1 | * | 4/2003  | Amamori .................. | 280/743.1 |
| 6,598,903 | B2 | * | 7/2003  | Okada et al. .............. | 280/743.2 |
| 6,672,614 | B2 | * | 1/2004  | Endo et al. ................ | 280/731 |
| 6,692,024 | B2 | * | 2/2004  | Fischer et al. ............. | 280/743.1 |
| 7,481,449 | B2 | * | 1/2009  | Ishiguro et al. ............ | 280/731 |
| 7,530,597 | B2 | * | 5/2009  | Bito .......................... | 280/742 |
| 7,766,381 | B2 | * | 8/2010  | Fujimori et al. ........... | 280/731 |
| 2002/0050704 | A1 | | 5/2002 | Abe | |
| 2002/0084635 | A1 | * | 7/2002 | Tajima et al. ............. | 280/732 |
| 2002/0093183 | A1 | | 7/2002 | Ishikawa et al. | |
| 2005/0167958 | A1 | | 8/2005 | Okada et al. | |
| 2006/0006633 | A1 | * | 1/2006 | Bito ......................... | 280/740 |
| 2006/0055157 | A1 | * | 3/2006 | Ishiguro et al. ........... | 280/731 |
| 2006/0175818 | A1 | * | 8/2006 | Thomas .................... | 280/743.1 |
| 2007/0052221 | A1 | * | 3/2007 | Okada et al. .............. | 280/735 |
| 2008/0030008 | A1 | * | 2/2008 | Zofchak et al. ........... | 280/728.2 |
| 2009/0302582 | A1 | * | 12/2009 | Koyama et al. ........... | 280/728.2 |

FOREIGN PATENT DOCUMENTS

| JP | A-H10-152008 | 6/1998 |
| JP | A-2000-085512 | 3/2000 |
| JP | A-2000-289553 | 10/2000 |
| JP | A-2002-137709 | 5/2002 |
| JP | A-2002-193059 | 7/2002 |

(Continued)

*Primary Examiner* — Joseph Rocca

(74) *Attorney, Agent, or Firm* — Posz Law Group, PLC

(57) ABSTRACT

The invention provides an airbag apparatus including an airbag that is folded toward an inflator attaching part and that is accommodated within a pad functioning as a case such that the airbag is provided with first and second folded parts arranged on a cabin side from an inflator. A tear line is formed on the pad at a position deviated from a center of the inflator toward the first folded part and divides the case into a first door and a second door. In the airbag apparatus, the second folded part that is covered by the first door is folded in a bellows shape.

9 Claims, 12 Drawing Sheets

(56) References Cited

FOREIGN PATENT DOCUMENTS

| JP | A-2004-106841 | 4/2004 |
| JP | A-2005-247291 | 9/2005 |
| JP | A-2005-280629 | 10/2005 |
| JP | A-2005-280630 | 10/2005 |
| JP | A-2006-21577 | 1/2006 |

\* cited by examiner

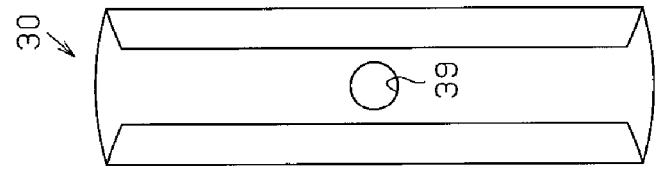
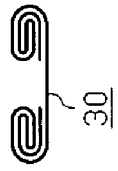
FIG. 4A
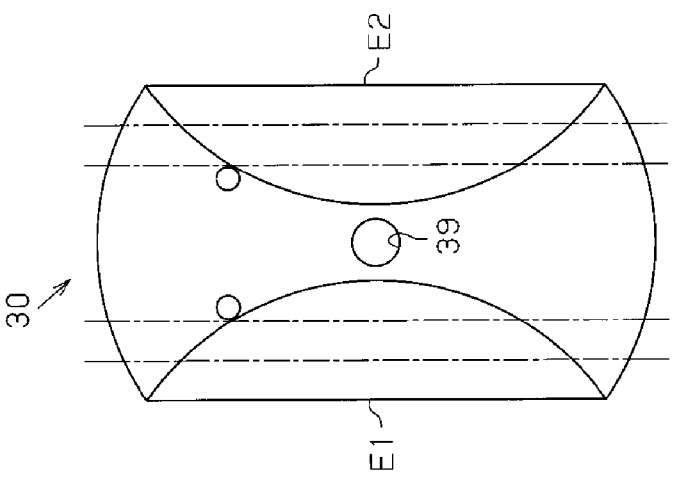
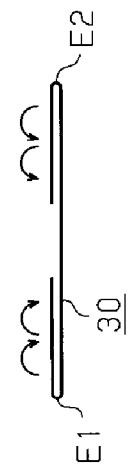
FIG. 4B
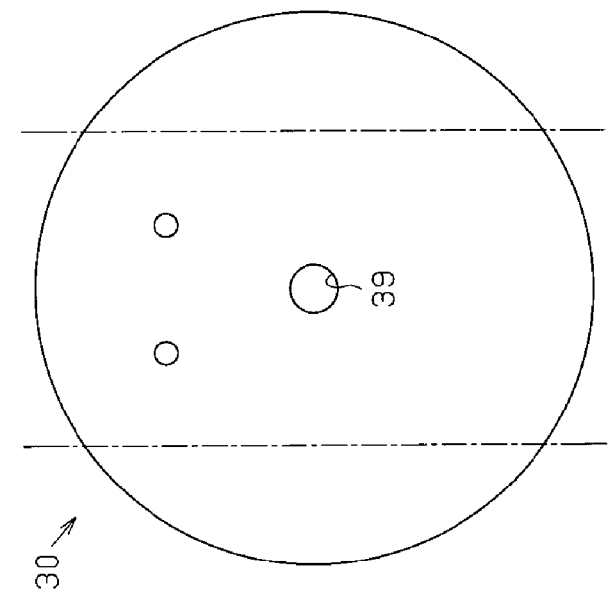
FIG. 4C

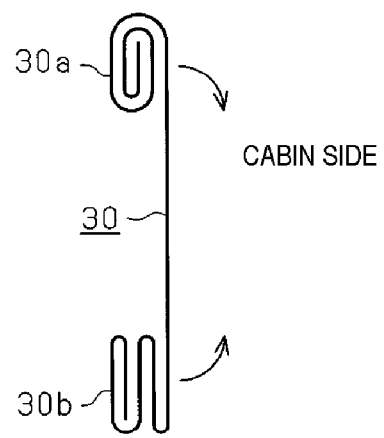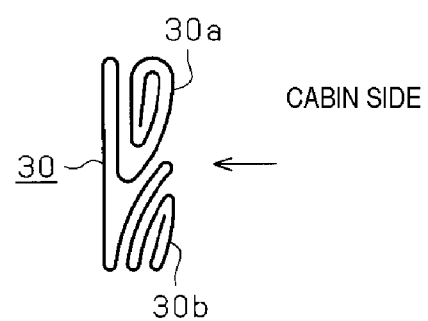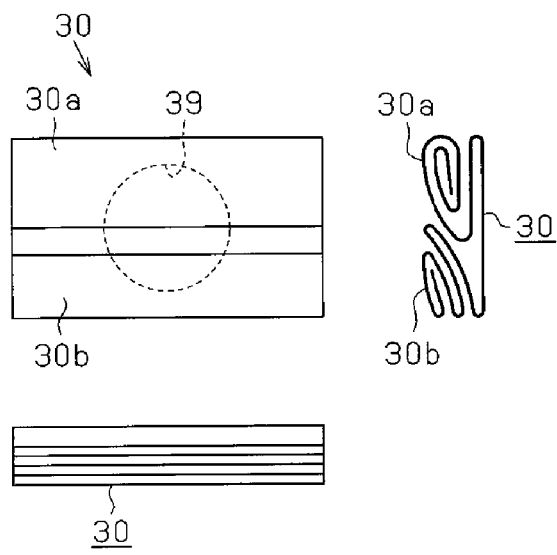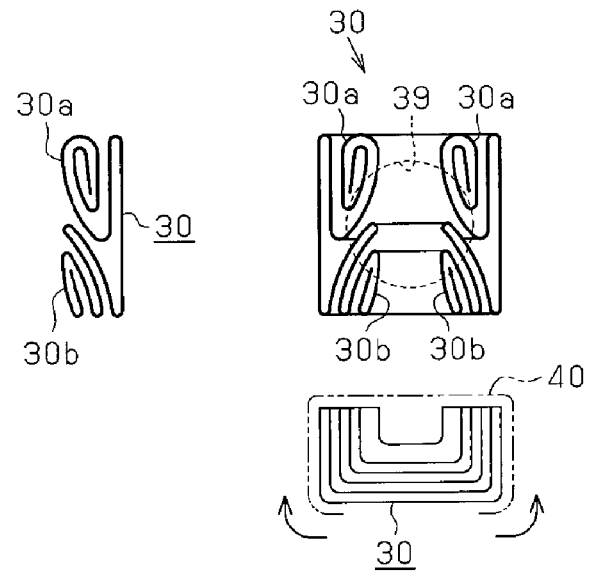

CABIN SIDE

AIRBAG APPARATUS

BACKGROUND OF THE INVENTION

1. Technical Field

The present invention relates to an airbag apparatus that expands from an inside of a case toward a cabin upon collision and the like and thus relieves and absorbs shock to protect a passenger.

2. Related Art

As an apparatus that relieves and absorbs shock, which results from collision and the like, to protect a passenger, an airbag apparatus has been known. For example, an airbag apparatus for a steering that expands toward a cabin upon collision and then deploys between a steering and a driver is installed in a central part of the steering of a vehicle.

In the airbag apparatus for a steering, an airbag is accommodated in a pad positioned at a center of the steering, with being folded toward an inflator that ejects gas for inflation. The pad that functions as a case for accommodating the airbag is provided with a recess-shaped tear line that is thinner than the other part so that it is fractured by pressure applied when the airbag is inflated and deployed. Thereby, when the airbag expands, the pad is fractured along the tear line, so that the airbag is inflated and expanded toward the cabin from an opening resulting from the fracture.

In most cases, an emblem is attached on the central part of the steering. Accordingly, in the airbag apparatus for a steering, it is necessary to provide the tear line while avoiding the emblem. For example, in an airbag apparatus disclosed in JP 2002-137709A, as shown in FIG. 13, a tear line 1b that extends in a lateral direction so as to connect two tear lines 1a extending in a longitudinal direction is provided to divide a pad 1 into an upper door A and a lower door B. However, the tear line 1b is provided to upwardly bypass an emblem 4.

FIG. 14 is a sectional view of showing a state that the airbag starts to inflate from an inside of the pad toward a cabin. In FIG. 14, a left side is the cabin-side.

An airbag 2 accommodated in the pad 1 is about to inflate by gas ejected from an inflator 3, from a part to which the inflator 3 is attached. However, when the tear line 1b is provided at a position that is deviated upwards from a center of the pad 1, as the airbag apparatus disclosed in JP 2002-137709A, an opening that is formed when the pad 1 is fractured is located at a position that is deviated upwards from the attachment position of the inflator 3, as shown in FIG. 14. Therefore, the airbag 2 is apt to deploy upwards, as shown with an outline arrow in FIG. 14, so that it is difficult to deploy the airbag 2 toward the front of the steering in a balanced manner.

The above problem is commonly caused when the position of the tear line provided to the case accommodating the airbag and the inflator is deviated from the center of the inflator, which is a base point of the inflation and deployment of the airbag. In addition, the above problem may be caused not only in the airbag apparatus for a steering but also an airbag apparatus for an assistant passenger's seat provided to a dashboard.

SUMMARY OF THE INVENTION

The invention has been made to solve the above problem. An object of the invention is to provide an airbag apparatus capable of deploying an airbag in a balanced manner even when a tear line provided to a case is formed at a position that is deviated from a center of an inflator becoming a base point of inflation and deployment of the airbag.

In the below, means for achieving the above object and operational effects thereof are described.

First aspect of the invention provides an airbag apparatus comprising:

an airbag that is folded toward an inflator attaching part so as to narrow a width of the airbag in a lateral direction and thus forms an intermediate shape extending in a longitudinal direction with the inflator attaching part being interposed therebetween, in which parts extending in the longitudinal direction in the intermediate shape are respectively folded toward the inflator attaching part to form a first folded part and a second folded part, and that is accommodated in a case with the first and second folded parts being arranged on a cabin side from the inflator, wherein the case is provided with a tear line that is formed at a position deviated from a center of the inflator toward the first folded part and divides the case into a first door and a second door, the first door overlapping over both the first and second folded parts and deploying from the second folded part serving as a support point and the second door overlapping over the first folded part and deploying from the first folded part serving as a support point, and wherein the second folded part is folded in a bellows shape.

In many cases, the airbag is folded in a roll shape. However, regarding the airbag folded in a roll shape, a leading end portion thereof is folded at a more inner side, so that the leading end portion is restrained by an outer part. Accordingly, the folded state of the leading end portion is not released until the folded state of a base end portion positioned at the outer side is released. Hence, it is difficult for the part folded in a roll shape to release the folded state, so that it takes time to inflate and deploy the corresponding part.

Compared to this, when the airbag is folded in a bellows shape, the folded part is not restrained by the other part, unlike the configuration in which the airbag is folded in a roll shape. Thus, when the airbag is folded in a bellows shape, the folded state is easily unfolded, compared to the configuration in which the airbag is folded in a roll shape.

According to the first aspect of the invention, the second folded part, which is more difficult to inflate and deploy than the first folded part because the second folded part is covered by a first door extending to a position overlapping over the first folded part, is folded in a bellows shape. Therefore, when gas is ejected from an inflator, the folded state of the second folded part is easily unfolded, so that the second folded part is easily inflated and deployed. As a result, even when a tear line provided to a case is formed at a position that is deviated from a center of the inflator becoming a base point of inflation and deployment of the airbag and the tear line is thus provided to a position biased to the first folded part, it is possible to enable the second folded part to rapidly inflate and expand toward a cabin, so that it is possible to deploy the airbag in a balanced manner.

In second aspect of the invention, the first and second folded parts arranged toward the cabin of the inflator may be partially overlapped between parts forming the first and second doors of the case and the inflator, and the second folded part at the overlapped part may be positioned more closely toward the cabin than the first folded part.

According to the above configuration, the second folded part is overlapped over the first folded part that is folded over the inflator. Thus, when the gas is ejected from the inflator and the airbag is thus inflated and deployed, the force with which the first folded part is deployed toward the cabin also acts as force with which the second folded part overlapped over the first folded part is deployed toward the cabin. Accordingly, when the airbag is inflated and deployed, the second folded part easily expands toward the cabin.

Accordingly, even when the tear line is provided at a position that is deviated from the attachment position of the inflator and the tear line is thus provided at a position biased to the first folded part-side, it is possible to enable the second folded part to rapidly expands toward the cabin, so that it is possible to deploy the airbag in a balanced manner.

In third aspect of the invention, the airbag may be provided therein with a rectification cloth that blocks a flow of gas that is ejected from the inflator toward the first folded part.

According to the above configuration, since it is possible to suppress the gas ejected from the inflator from being directly introduced into the first folded part, it is possible to suppress the deploying speed of the first folded part. Therefore, it is possible to deploy the airbag in a balanced manner by suppressing the deploying speed of the first folded part to the deploying speed of the second folded part that is difficult to deploy well.

In forth aspect of the invention, the airbag apparatus may be an airbag apparatus for a steering in which a pad functioning as the case is provided at a center of a steering of a vehicle and the airbag and the inflator are accommodated in the pad, and the first folded part may be provided at an upper side of the second folded part at a state in which the steering is neutral, the tear line formed at the pad may be provided to upwardly bypass an emblem that is provided at a center of the steering.

In fifth aspect of the invention, a leading end portion of the second folded part folded in a bellows shape may be folded back from a lower side in an opposite side to the cabin-side.

The airbag apparatus of the first to third aspect of the invention can be applied as an airbag for a steering, as referred to the fourth aspect of the invention. The neutral state is a state in which a steering is not steered in any direction of left and right, which means a steering state of the steering when a vehicle travels in a straight line (which is also the same as the below).

As referred to in the fourth aspect of the invention, when the second folded part is disposed to locate at a lower side, it is preferable to fold back the leading end portion of the second folded part from the lower side in an opposite direction to the cabin-side. By adopting the configuration, when the folded state of the second folded part is released, the leading end portion is continuously supplied toward the cabin from the lower side as if it depicted an arc from the folded back portion serving as a support point. Accordingly, when the leading end portion is brought into contact with a passenger during the deployment, the contact portion is positioned below the support point.

Contrary to this, in a configuration in which the leading end portion is folded back from the upper side, when the folded state of the second folded part is released, the leading end portion is continuously supplied toward the cabin from the upper side as if it depicted an arc from the folded back portion serving as a support point. Accordingly, when the leading end portion is brought into contact with a passenger during the deployment, the contact portion is positioned above the support point.

In other words, when the configuration is adopted in which the leading end portion of the second folded part is folded back from the lower side in the opposite direction to the cabin-side, it is possible to locate the contact portion of the leading end portion, which is contacted to the passenger during the deployment, at the lower side, compared to the configuration in which the leading end portion of the second folded part is folded back from the upper side.

When the airbag is brought into contact with a passenger during the inflation and deployment, the airbag may get stuck with the passenger, so that it is inflated and deployed from the corresponding contact portion serving as a base point. At this time, when the contact portion with the passenger is located at the upper side, a head of the passenger may be raised from the lower side by the airbag that has been inflated upwards from the contact portion serving as a base point.

However, as referred to in the fifth aspect of the invention, when the leading end portion of the second folded part is folded back from the lower side in the opposite direction to the cabin-side, it is possible to locate the contact portion at the lower side, compared to the configuration in which the leading end portion is folded back from the upper side as described above. Accordingly, even when the airbag is inflated upwards from the contact portion serving as a base point, it is difficult for the head of the passenger to be raised upwards. In addition, even when the head is raised, it is possible to reduce the shock at that time.

In sixth aspect of the invention, the airbag may be provided therein with a rectification cloth that swells into a tubular shape in the airbag by gas ejected from the inflator and introduces the gas into the airbag from both ends thereof, thereby rectifying the gas ejected from the inflator, and wherein the airbag is folded with the rectification cloth being biased to a part forming the second folded part, and the airbag is accommodated in the case with the rectification cloth being put in the second folded part.

According to the above configuration, since the rectification cloth is put in the second folded part, when the gas is ejected from the inflator and the rectification cloth starts to be thus inflated, the corresponding force acts as force to deploy the second folded part. Therefore, the second folded part is easily deployed. In addition, even when the tear line is provided at the position that is deviated from the mounting position of the inflator and the tear line is thus provided to a position biased to the first folded part, it is possible to deploy the airbag in a balanced manner.

According to the airbag apparatus of the invention, even when the tear line provided to the case is set at a position that is deviated from the center of the inflator becoming a base point of inflation and deployment of the airbag, it is possible to deploy the airbag in a balanced manner.

BRIEF DESCRIPTION OF THE DRAWINGS

FIGS. 4A, 4B and 4C show a method of folding the airbag in an intermediate form.

FIG. 6A is a schematic view showing a state in which a first folded part and a second folded part are formed, and FIG. 6B is a schematic view showing a state in which the first folded part and the second folded part are folded back to a cabin.

FIGS. 7A and 7B schematically show a method of folding the airbag in a final accommodation form.

DETAILED DESCRIPTION OF THE PREFERRED EMBODIMENTS

Hereinafter, an illustrative embodiment in which an airbag apparatus of the invention is implemented as an airbag apparatus for a steering to be mounted to a steering of a vehicle will be described with reference to FIGS. 1 to 9.

Figure 1:
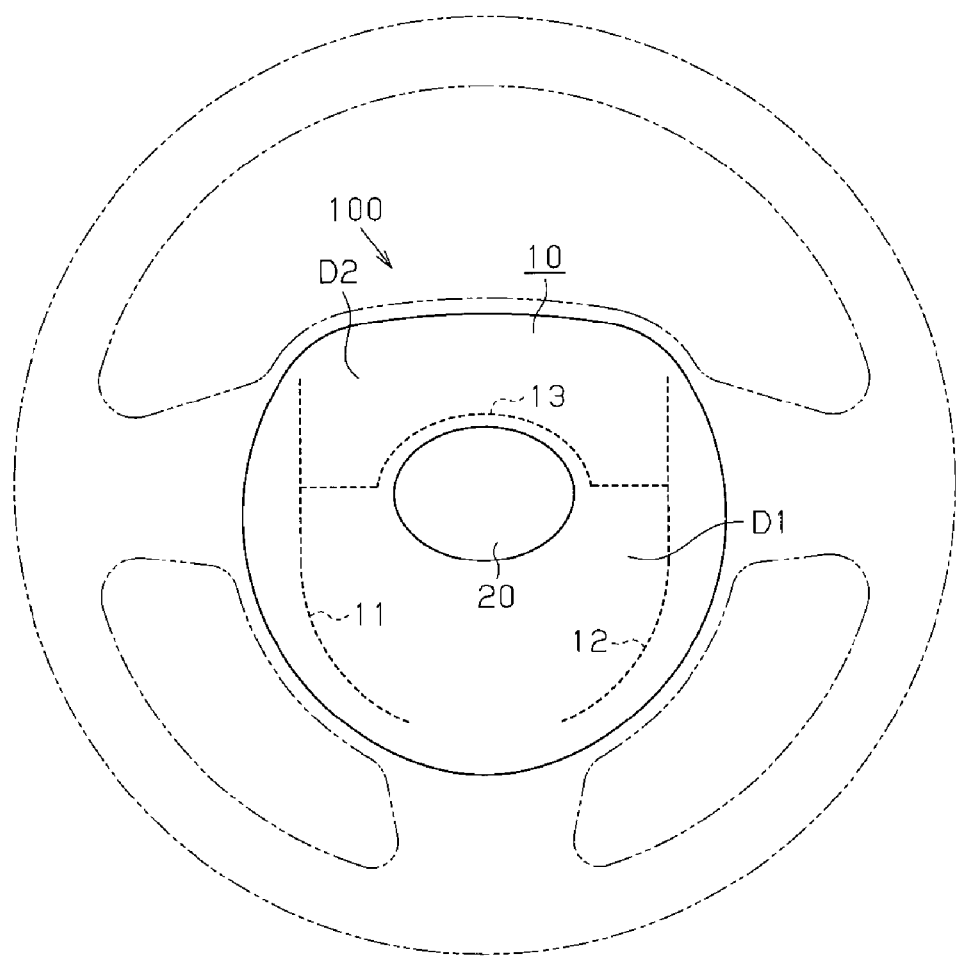
FIG. 1 is a front view of an airbag apparatus according to an illustrative embodiment of the invention.
Figure 2:
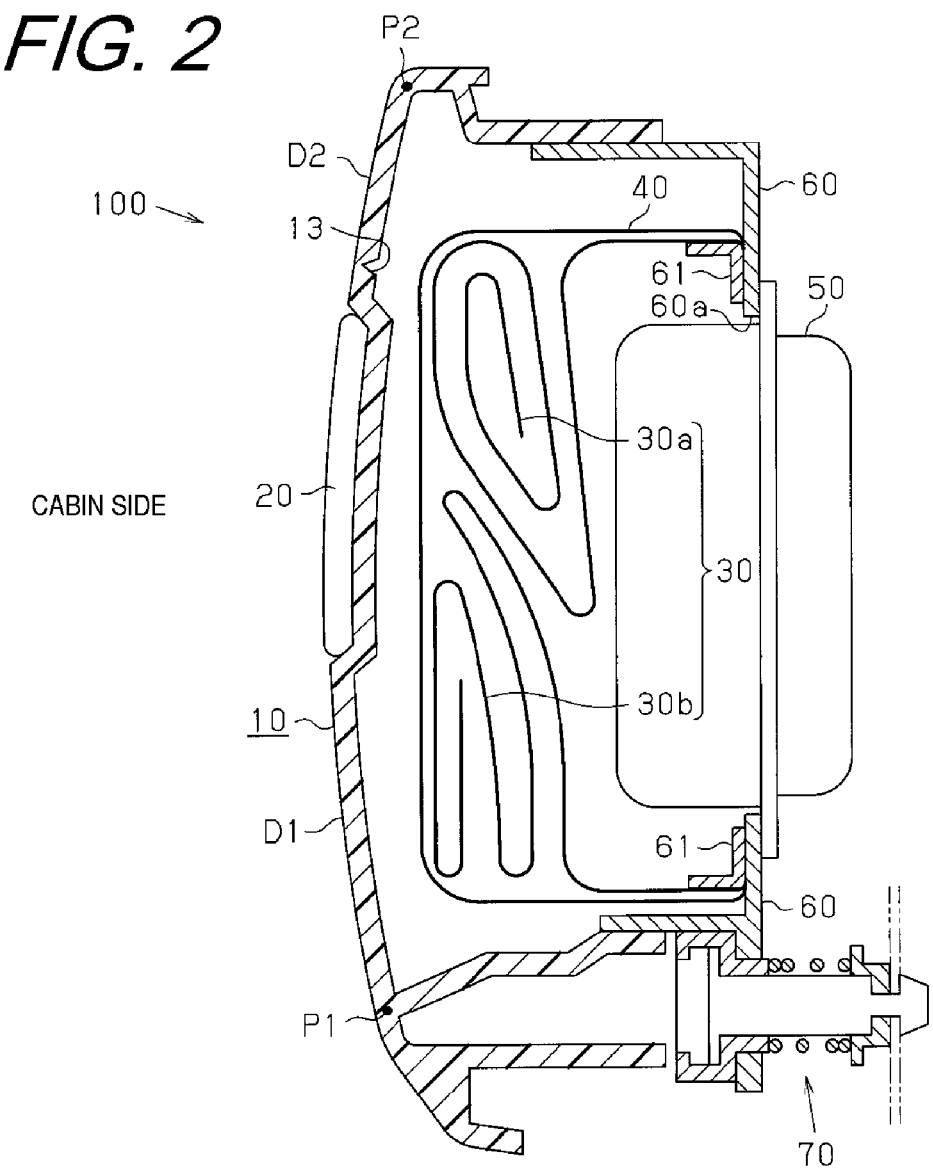
FIG. 2 is a sectional view of the airbag apparatus.

FIG. 1 is a front view of an airbag apparatus 100 according to this illustrative embodiment and FIG. 2 is a sectional view of the airbag apparatus 100. As shown in FIG. 1, the airbag apparatus 100 is assembled, as a steering pad, at a center of a steering shown with a dashed-two dotted line.

At the central part of a pad 10 functioning as a case in the airbag apparatus 100, an emblem 20 is attached to be located at a substantially center of the steering. As shown in FIG. 2, a folded airbag 30 is accommodated in the pad 10. In FIG. 2, the folded airbag 30 is schematically shown with a solid line.

The folded airbag 30 is fixed to a bag holder 60 with being enclosed by a protection cloth 40. Specifically, a ring retainer 61 having a ring shape is inserted in the airbag 30. With the airbag 30 and the protection cloth 40 being put between the ring retainer 61 and the bag holder 60, the ring retainer 61 is fixed to the bag holder 60 by a bolt, a rivet and the like, so that the airbag 30 is fixed to the bag holder 60.

An inflator 50 having a disc shape that generates gas for inflating the airbag 30 is fixed to the bag holder 60. As shown in FIG. 2, the inflator 50 is inserted into an attachment hole 60a formed at the bag holder 60 and is fixed to the bag holder 60 so that a gas ejecting port (not shown) faces the inside of the airbag 30.

As shown in FIG. 2, the pad 10 is covered to the bag holder 60 having the airbag 30 and the inflator 50 fixed thereto so as to enclose the airbag 30, so that the airbag apparatus 100 is configured.

In the meantime, as shown in FIG. 2, the bag holder 60 is connected to a frame of the steering (which is shown with dashed-two dotted line) through a horn switch 70. The horn switch 70 is a switch for operating a horn (warning horn) of a vehicle. Accordingly, when the airbag 100 fixed to the steering through the horn switch 70 is pushed by the passenger, the horn is operated. The airbag apparatus 100 of this illustrative embodiment is supported to the steering at three points. In other words, the airbag apparatus 100 has not only the horn switch 70 shown in FIG. 2 but also two horn switches 70 (not shown) and is fixed to the steering through the three horn switches 70.

As shown with the dotted lines in FIG. 1, the pad 10 of the airbag apparatus 100 is provided with recess-shaped tear lines 11, 12, 13 thinner than the other part so that they are fractured by pressing force applied when the airbag 30 is inflated and deployed.

More specifically, the airbag apparatus 100 is formed with a pair of tear lines 11, 12 that extends in the longitudinal direction in FIG. 1 and a tear line 13 that extends in the left-right direction in FIG. 1 to connect the pair of tear lines 11, 12. Thereby, as shown in FIG. 1, when the steering is at a neutral state, the pad 10 is divided into a first door D1 located at a lower side and a second door D2 located at an upper side. Thereby, when the airbag 30 is inflated and deployed, the pad 10 is fractured along the tear lines 11 to 13. While the first door D1 is deployed toward the cabin about a lower part serving as a support point and shown with a point P1 in FIG. 2, the second door D2 is deployed about an upper part serving as a support point and shown with a point P2 in FIG. 2. As a result, an opening is formed and the airbag 30 expands therefrom toward the cabin. In the meantime, the tear lines 11 to 13 are formed on a surface of an inner side of the pad 10 in which the airbag 30 is accommodated so that they are not seen from a passenger in the cabin.

In addition, since the emblem 20 is attached to the central part of the pad 10, the tear line 13 extending in the lateral direction is provided to bypass the upper side of the emblem 20 while avoiding the emblem 20, as shown in FIGS. 1 and 2.

Figure 3A:
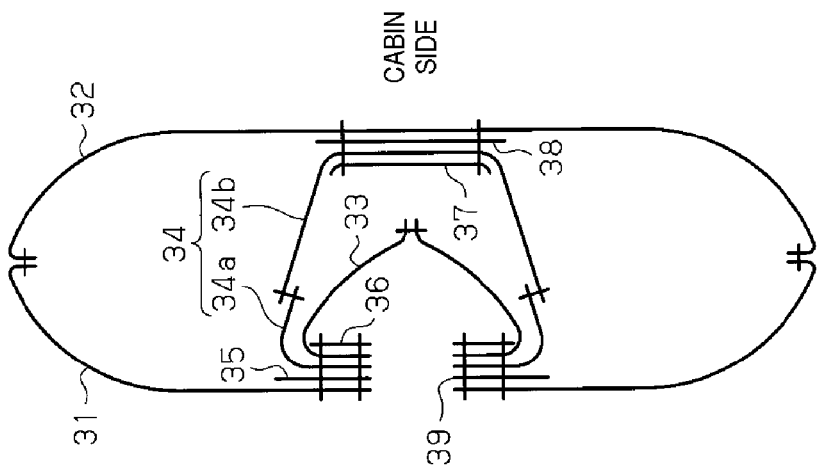
FIG. 3A is a rear view of the airbag and FIG. 3B is a sectional view of the airbag.
Figure 3B:
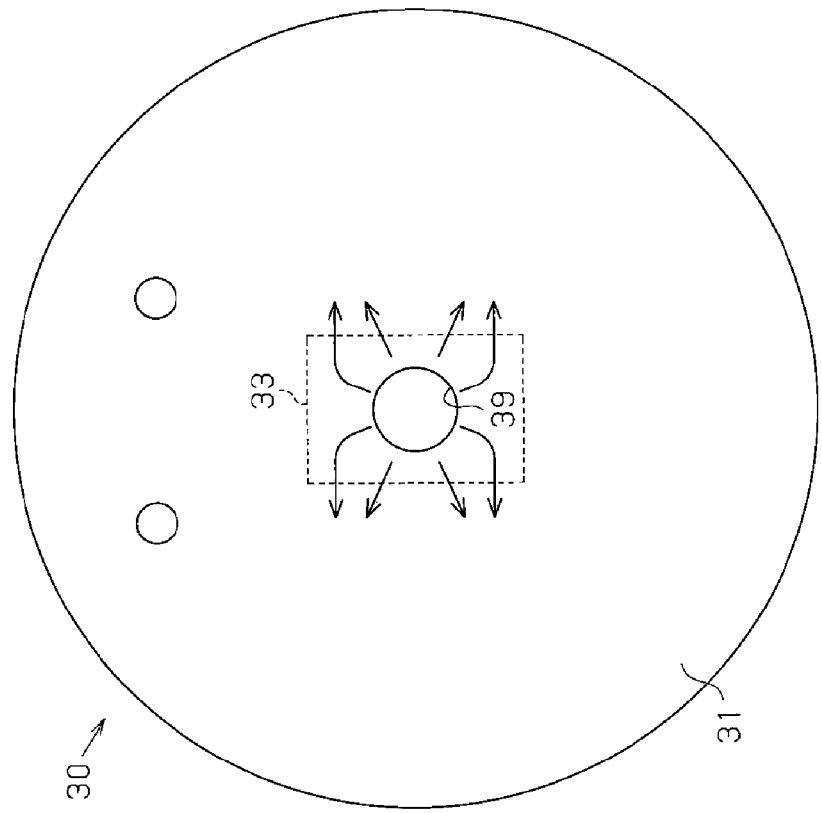

In the below, the configuration of the airbag 30 accommodated in the pad 10 and a method of folding the airbag are described with reference to FIGS. 3A to 7B. FIGS. 3A and 3B illustrate the configuration of the airbag 30, in which FIG. 3A shows a backside of the airbag 30 into which the inflator 50 is inserted, i.e., is a rear view when seen from an opposite side to the cabin-side. In the meantime, FIG. 3B is a sectional view that shows an internal structure of the airbag 30.

As shown in FIG. 3A, the airbag 30 is circular. The backside of the airbag 30 is formed at its center with a hole that forms an inflator attaching part 39 for attaching the inflator 50. In addition, as shown in FIG. 3A, the backside of the airbag 30 is also formed with two vent holes that exhaust gas in the airbag 30 when the airbag 30 is inflated and deployed.

As shown in FIG. 3B, the airbag 30 is formed into a bag shape by seaming an inflator-side panel 31, which configures a surface of the backside having the inflator attaching part 39 formed thereto, and a cabin-side panel 32, which configures a surface of a cabin-side facing a driver when the airbag is inflated and deployed.

The airbag 30 has rectification cloth 33 attached therein that swells into a tubular shape when gas is ejected from the inflator 50, thereby rectifying the gas. The rectification cloth 33 is configured by a band-shaped part having a hole that is formed at a center thereof and is integrated with the inflator attaching part 39, and a peripheral edge of the hole is seamed to the inflator-side panel 31 together with reinforcement cloth 36. As shown in FIG. 3B, both end portions of the rectification cloth are seamed to form a tubular shape.

A first belt member 34a is put together with the reinforcement cloth 35 between the inflator-side panel 31 and the rectification cloth 33. The first belt member 34a and the reinforcement cloth 35 are also seamed to the inflator-side panel 31 together with the rectification cloth 33 and the reinforcement cloth 36.

As shown in FIG. 3B, a second belt member 34b is seamed to a center of the cabin-side panel 32. In the meantime, the second belt member 34b is put between reinforcement clothes 37, 38 and is seamed to the center of the cabin-side panel 32, together with the reinforcement clothes 37, 38.

As shown in FIG. 3B, the first belt member 34a and the second belt member 34b are seamed to each other at their leading end portions. Thereby, a tether 34 that connects the inflator-side panel 31 and the cabin-side panel 32 is formed.

In the airbag 30, the inflator-side panel 31 and the cabin-side panel 32 are connected by the tether 34. As a result, when the airbag 30 is inflated and deployed, the thickness of the airbag 30, i.e., a length in the left-right direction in FIG. 3B is controlled by a length of the tether 34.

In addition, the rectification cloth 34, which swells into a tubular shape as described above, is provided in the airbag 30.

Accordingly, when the gas is ejected from the inflator 50 attached to the inflator attaching part 39, the gas is introduced into the airbag 30 through the opening at both ends of the rectification cloth 33 having swollen into a tubular shape, as shown in arrows of FIG. 3A.

The airbag 30 configured as described above is folded toward the inflator attaching part 39 and is accommodated in the pad 10. In the below, the method of folding the airbag 30 is described with reference to FIGS. 4A to 7C.

As shown in FIGS. 4A to 4C, the airbag 30 is first folded toward the inflator attaching part 39 so that the width of the airbag in the lateral direction, which is the left-right direction ins FIGS. 4A to 4C, is narrowed, so that the airbag forms an intermediate shape extending in the longitudinal direction, which is the vertical direction in FIGS. 4A to 4C, with the inflator attaching part 39 being interposed therebetween. In FIGS. 4A to 4C, the rear view is shown in the upper part and the side view, which is seen from the side of the airbag 30, is shown in the lower part.

Specifically, the left and right end portions of the airbag 30 are folded back at positions shown with dashed-dotted lines in FIG. 4A toward the inflator attaching part 39, as shown with the arrow in the lower pictorial view of FIG. 4A, so that the airbag becomes a state as shown in FIG. 4B.

Then, the airbag is folded in a roll shape as folded portions shown with E1, E2 in FIG. 4B are wound inwards. In other words, the airbag is continuously folded two times, as shown with the arrows in the lower pictorial view of FIG. 4B, so that the airbag 30 forms an intermediate shape extending in the longitudinal direction, as shown in FIG. 4C.

The longitudinally extending portions of the airbag 30 having formed an intermediate shape extending in the longitudinal direction are additionally folded toward the inflator attaching part 39, as shown in FIGS. 5A to 5E. In FIGS. 5A to 5E, the rear view is shown in the left and the pictorial view showing the side of the folded airbag 30 is shown in the right.

Figures 5A, 5B:
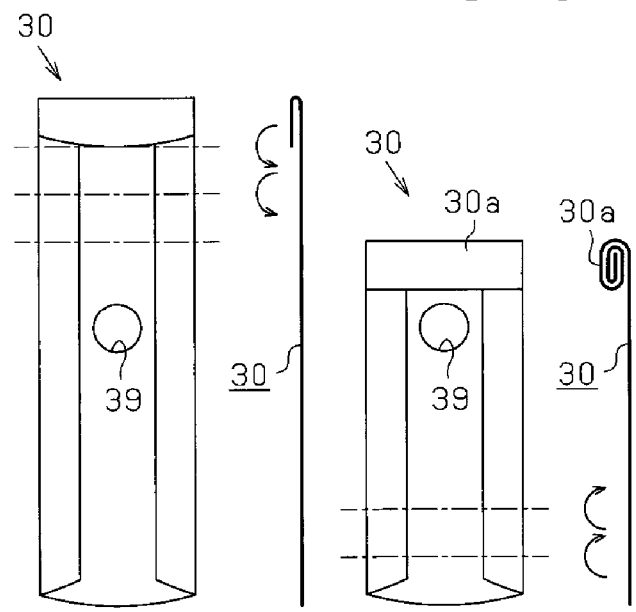
FIGS. 5A, 5B, 5C, 5D and 5E show a method of folding the airbag from the intermediate form.

Specifically, as shown in FIG. 5A, in the airbag 30 of the intermediate shape, an end portion of the longitudinally extending part, which is positioned at the upper side in FIGS. 5A to 5E, is folded back toward the inflator attaching part 39. Then, the folded-back portion is folded in a roll shape so that it is wound inwards. In other words, as shown with the arrow in the right pictorial view of FIG. 5A, the folded-back portion is continuously folded two times, so that the part extending in the upper direction is folded toward the inflator attaching part 39 and thus becomes a first folded part 30*a*.

Figures 5C, 5D, 5E:
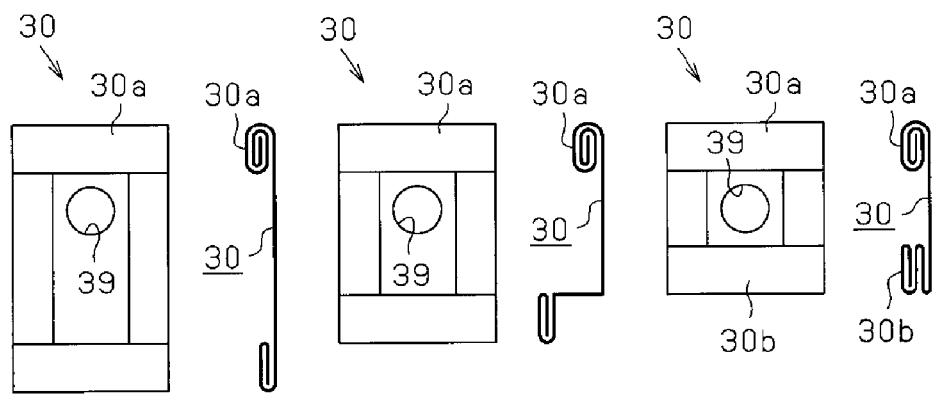

In the meantime, a part of the longitudinally extending part, which is positioned at the lower side in FIGS. 5A to 5E, is continuously forded two times, as shown with the arrow in the right pictorial view of FIG. 5B, so that a leading end portion thereof is wound inwards, as shown in FIG. 5C. Then, as shown in FIG. 5D, the part positioned at the lower side in FIGS. 5A to 5E is additionally bent in a crank shape so that the folded part approaches the inflator attaching part 39, so that the part is folded in a bellows shape, as shown in FIG. 5E. By doing so, the part extending in the lower side is folded in a bellows shape, so that it is folded toward the inflator attaching part 39 and thus becomes a second folded part 30*b*.

The airbag 30 having the first folded part 30*a* and the second folded part 30*b* formed as described above is additionally folded, as shown in FIGS. 6A, 6B, 7A and 7B, so that the airbag forms a final accommodation shape.

Specifically, as shown in FIG. 6A, the first folded part 30*a* and the second folded part 30, which are folded toward the inflator attaching part 39, are folded back toward the cabin side opposite to the inflator attaching part 39. At this time, the first folded part 30*a* is folded earlier than the second folded part 30*b*, so that a part of the second folded part 30*b* overlaps over a part of the first folded part 30*a*, as shown in FIG. 6B.

FIG. 7A is three views showing the folded-back state of the first folded part 30*a* and the second folded part 30, which is a front view showing the folded-back airbag 30, when seen from the cabin side, as shown in the arrow of FIG. 6B, and a side view thereof.

In the airbag 30 having the first folded part 30*a* and second folded part 30*b* folded back, the end portions positioned in the left-right direction of the front view of FIG. 7A are bent toward the cabin side, as shown with the arrow of FIG. 7B, so that the airbag forms the final accommodation state.

The airbag 30, which is bent and forms the final accommodation state, is enclosed by the protection cloth 40, as shown with the dashed-two dot line in FIG. 7B, and is kept at that state. In the meantime, the protection cloth 40 is adapted to easily fracture in pieces when the airbag 30 is inflated. When the gas is ejected from the inflator 50 and the airbag 30 is thus inflated, the protection cloth 40 is torn and the airbag 30 is thus deployed.

The airbag 30, which forms the accommodation shape, is fixed to the bag holder 60 together with the protection cloth 40, as described above, and is accommodated in the pad 10 with the inflator 50 being inserted therein, as shown in FIG. 2.

In the meantime, when the airbag 30 is accommodated in the pad 10, the arrangement direction is set so that the first folded part 30*a* of the airbag 30 is positioned at the upper side, the second folded part 30*b* is positioned at the lower side and the second folded part 30*b* is covered by the first door D1, as shown in FIG. 2.

According to the above illustrative embodiment, following operational effects are realized.

(1) In many cases, the airbag 30 is folded in a roll shape. However, in the airbag apparatus 100 according to the above illustrative embodiment, the second folded part 30*b* is folded in a bellow shape, as shown in FIG. 2.

Figure 8:
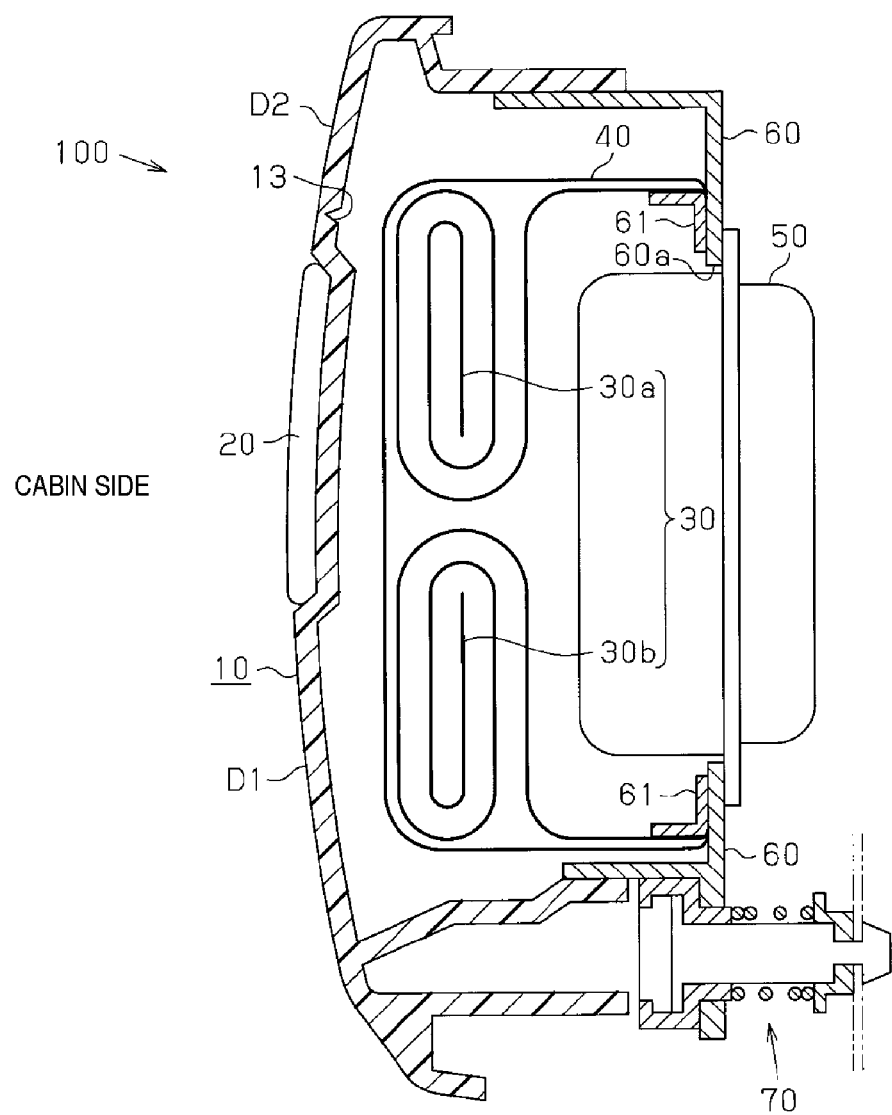
FIG. 8 is a sectional view of an airbag according to a comparative example.

For example, as described above, even when the airbag 30, which extends in the longitudinal direction and is folded in the intermediate shape, is folded in the accommodated shape, in many cases, the second folded part 30*b* positioned at the lower side is folded in the roll shape, as shown in FIG. 8. However, regarding the airbag 30 folded in a roll shape, a leading end portion thereof is folded at a more inner side, so that the leading end portion is restrained by an outer part. Accordingly, the folded state of the leading end portion is not released until the folded state of a base end portion close to the inflator attaching part 39 positioned at the outer side is released. Hence, it is difficult for the part folded in a roll shape to release the folded state, so that it takes time to inflate and deploy the corresponding part.

Compared to this, in the airbag apparatus 100 of the above illustrative embodiment, the second folded part 30*b*, which is covered by the first door D1 extending to the position overlapping with the first folded part 30*a* and is more difficult to inflate and deploy than the first folded part 30*a*, is folded in the bellows shape. When the airbag 30 is folded in the bellows shape, the folded part is not restrained by the other part, unlike the configuration in which the airbag is folded in the roll shape. Accordingly, when the airbag 30 is folded in the bellows shape, the folded state is well released, compared to the configuration in which the airbag is folded in the roll shape.

Hence, according to the airbag apparatus 100 of this illustrative embodiment, even when the tear line 13 is provided at the position biased to the first folded part 30*a*, it is possible to enable the second folded part 30*b* to rapidly expand toward the cabin. Therefore, it is possible to deploy the airbag in a balanced manner.

(2) The second folded part 30b is overlapped over the first folded part 30a that is overlapped over the inflator 50. Accordingly, when the gas is ejected from the inflator 50 and the airbag 30 is thus inflated and deployed, the force with which the first folded part 30a is deployed toward the cabin-side also acts as force with which the second folded part 30b overlapped over the first folded part is deployed toward the cabin. As a result, when the airbag 30 is inflated and deployed, the second folded part 30b easily expands toward the cabin.

Thereby, even when the tear line 13 is provided at a position that is deviated from the mounting position of the inflator 50 and the tear line 13 is thus provided at a position biased to the first folded part 30a, it is possible to deploy the airbag in a balanced manner so as to enable the second folded part 30b to rapidly expand toward the cabin.

(3) In the airbag 30, the rectification cloth 33 is provided. As described above, when the gas is ejected from the inflator 50, the gas is introduced into the airbag 30 through the opening at both ends of the rectification cloth 33 having expanded in a tubular shape, as shown in arrows of FIG. 3A. In other words, the airbag 30 is provided therein with the rectification cloth 33 so as to block the flow of the gas that is ejected from the inflator 50 toward the upper side in FIG. 3A, i.e., toward the first folded part 30a.

Therefore, the gas ejected from the inflator 50 is suppressed from being directly introduced into the first folded part 30a by the rectification cloth 33, so that the deploying speed of the first folded part 30a is suppressed. Accordingly, the deploying speed of the first folded part 30a is suppressed to the deploying speed of the second folded part 30b that is difficult to deploy well, so that it is possible to deploy the airbag 30 in a balanced manner.

(4) As described above with reference to FIGS. 5A to 5E, the leading end portion of the second folded part 30b is wound inwards and the second folded part 30b is then folded in a bellows shape. Accordingly, as shown in FIG. 2, the leading end portion of the second folded part 30b positioned at the lower side is folded back from the lower side in the opposite direction to the cabin-side.

Figure 9:
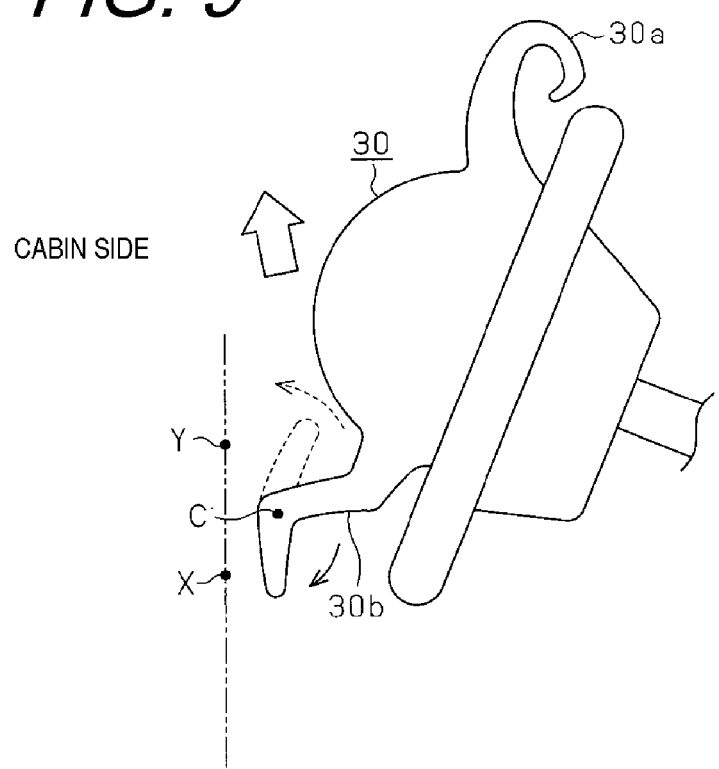
FIG. 9 is a side view of a steering part, which shows an airbag state during inflation and deployment.

Like this, the leading end portion of the second folded part 30b is folded back, so that when the airbag 30 expands from the steering, as shown in FIG. 9, the folded back leading end portion is continuously supplied toward the cabin from the lower side as if it depicted an arc from the folded back portion (point C in FIG. 9) serving as a support point. Accordingly, when the leading end portion is brought into contact with a passenger during the deployment, the contact portion is positioned below the support point. For example, when the leading end portion of the airbag 30 is brought into contact with a passenger at a position shown with the dashed-two dotted line in FIG. 9, the supplied leading end portion is contacted to the passenger at a point X.

Contrary to this, in the configuration in which the leading end portion is folded back from the upper side, rather than the lower side as the above illustrative embodiment, when the folded state of the second folded part 30b is released, the leading end portion is continuously supplied toward the cabin from the upper side as if it depicted an arc from the folded back portion (point C in FIG. 9) serving as a support point. Accordingly, when the leading end portion is brought into contact with a passenger during the deployment, the contact portion is positioned above the support point. For example, when the leading end portion of the airbag 30 is brought into contact with a passenger at a position shown with the dashed-two dotted line in FIG. 9, the supplied leading end portion is contacted to the passenger at a point Y.

In other words, when the configuration is adopted in which the leading end portion of the second folded part 30B is folded back from the lower side in the opposite direction to the cabin-side, as the above illustrative embodiment, it is possible to locate the contact portion of the leading end portion, which is contacted to the passenger during the deployment, at the lower side, compared to the configuration in which the leading end portion of the second folded part is folded back from the upper side.

When the airbag 30 is brought into contact with a passenger during the inflation and deployment, the airbag 30 may get stuck with the passenger, so that it is inflated and deployed toward the upper side from the corresponding contact portion serving as a base point, as shown with the outline arrow in FIG. 9. At this time, when the contact portion with the passenger is located at the upper side, as shown with the point Y, a head of the passenger may be raised from the lower side by the airbag that has been inflated toward the upper side from the contact portion serving as a base point.

However, when the leading end portion of the second folded part 30b is folded back from the lower side in the opposite direction to the cabin-side, as the above illustrative embodiment, it is possible to locate the contact portion at the lower side, compared to the configuration in which the leading end portion is folded back from the upper side as described above. Accordingly, even when the airbag 30 is inflated upwards from the contact portion serving as a base point, it is difficult for the head of the passenger to be raised upwards. In addition, even when the head is raised, it is possible to reduce the shock at that time.

The above illustrative embodiment can be appropriately changed as follows.

In the above illustrative embodiment, the second folded part 30b, which is folded in a bellows shape, is partially overlapped over the first folded part 30a.

Figure 10:
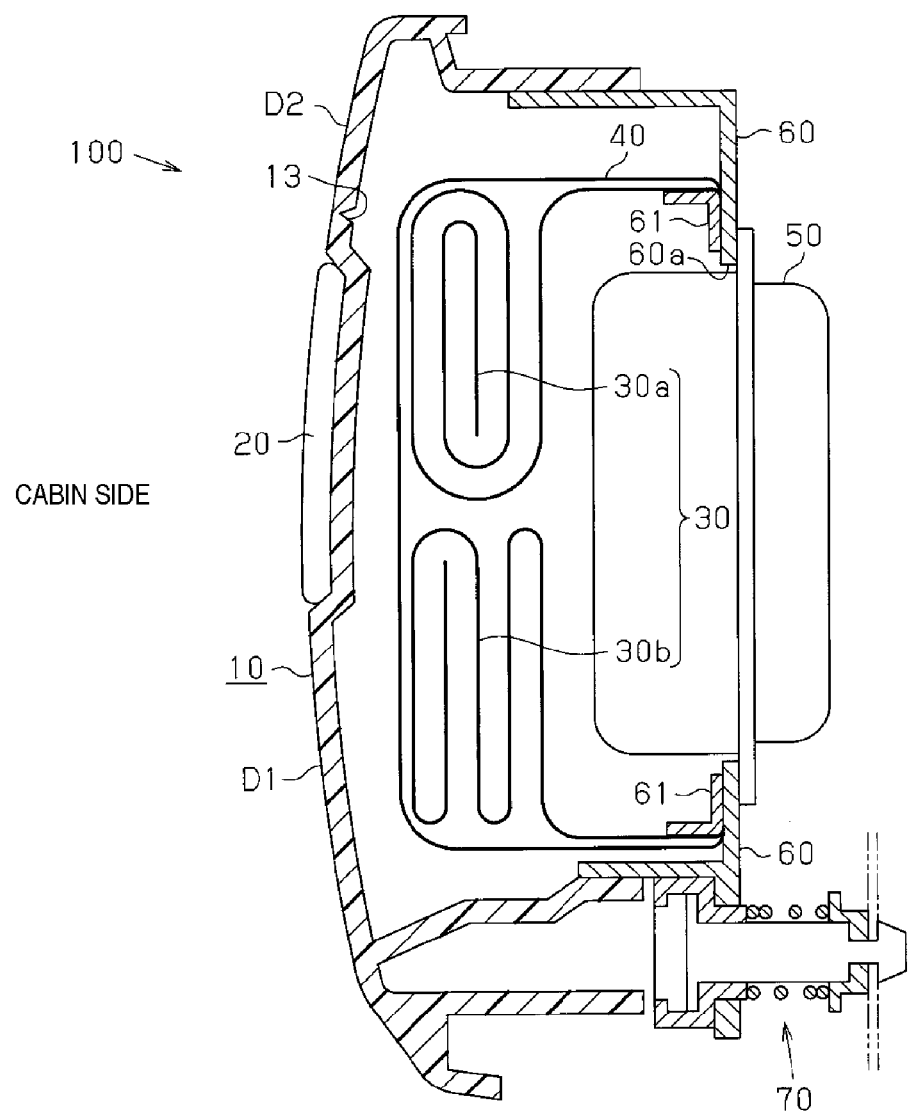
FIG. 10 is a sectional view of an airbag apparatus according to a modified embodiment of the invention.

Regarding this, the folded state of the second folded part 30b is easily released inasmuch as the second folded part 30b is folded in a bellows shape, compared to the configuration in which the second folded part 30b is folded in a roll shape. Accordingly, it is possible to easily deploy the second folded part 30b. Hence, as shown in FIG. 10, a configuration may be adopted in which the second folded part 30b folded in a bellows shape is received in the pad 10 without being overlapped over the first folded part 30a.

In this case, the operational effect described in the above (2) is not realized. However, the operational effects described in the above (1), (3) and (4) can be realized.

Figure 11:
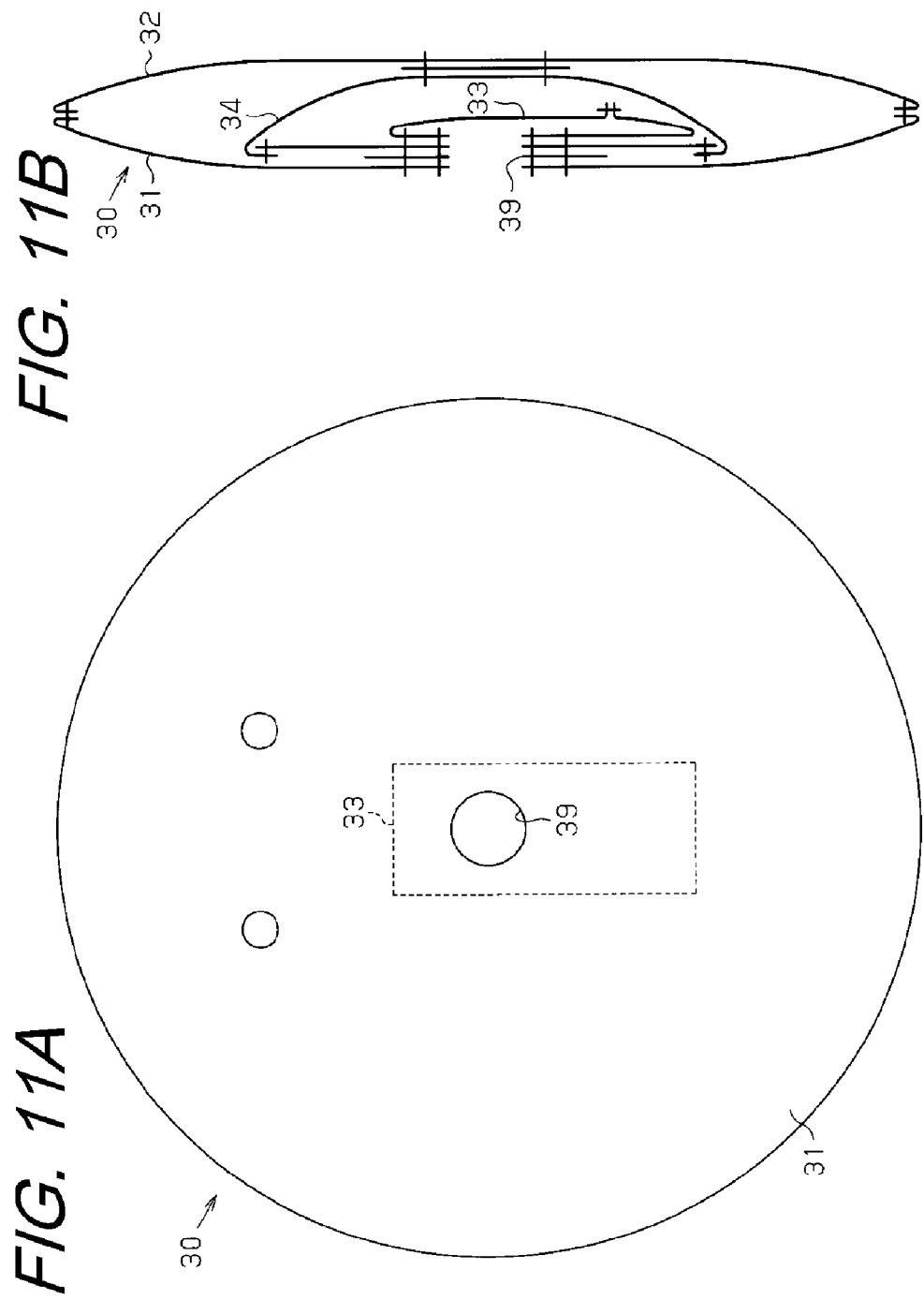
FIG. 11A is a rear view of the airbag at a deflated state and FIG. 11B is a sectional view of the airbag at the deflated state.

When folding the airbag 30, it is preferable to fold the airbag 30 with the rectification cloth 33 being biased to the part forming the second folded part 30b, i.e., to the lower side of the airbag 30, as shown in FIGS. 11A and 11B.

Figure 12:
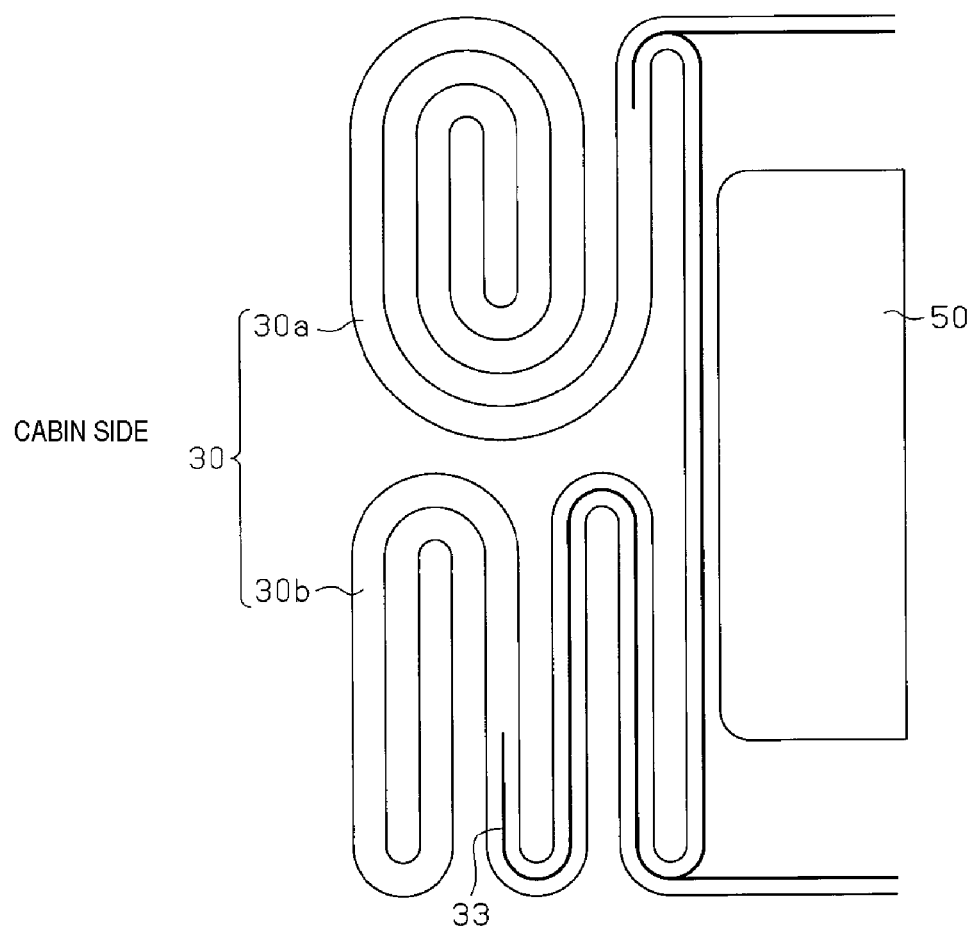
FIG. 12 is a schematic view showing a state of a rectification cloth at an accommodation state.
Figure 13:
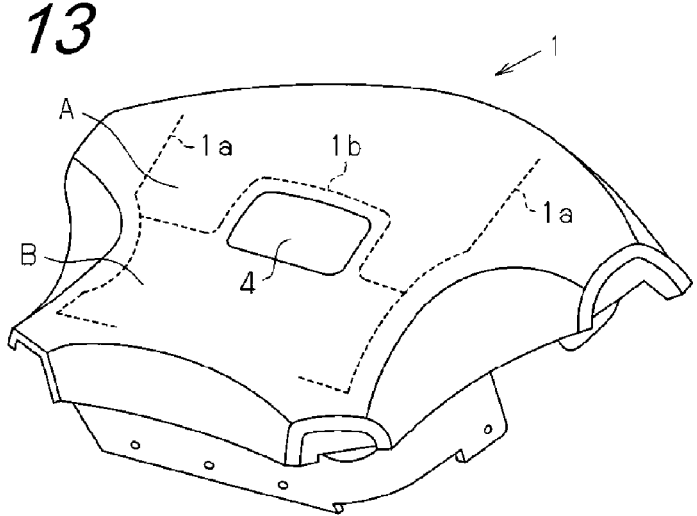
FIG. 13 is a perspective view of a pad of an airbag apparatus according to the related art.
Figure 14:
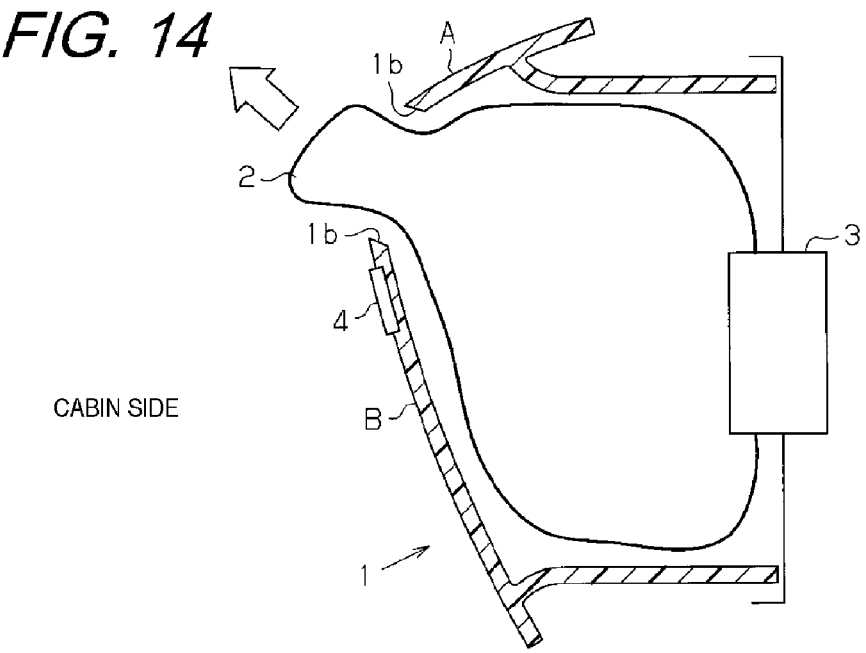
FIG. 14 is a sectional view of showing a state in which an airbag of the airbag apparatus according to the related art starts to expand.

Like this, when the airbag is folded with the rectification cloth 33 being biased to the lower side of the airbag 30, the rectification cloth 33 is put in the second folded part 30b, as shown in FIG. 12, and the airbag 30 is accommodated in the pad 10 at that state.

According to this configuration, since the rectification cloth 33 is put in the second folded part 30b, when the gas is ejected from the inflator 50 and thus the rectification cloth 33 starts to inflate, the corresponding force acts force with which the second folded part 30b is deployed. Therefore, the second folded part 30b is deployed more easily, so that even when the tear line 13 is provided at a position that is deviated from the mounting position of the inflator 50 and the tear line 13 is provided at a position biased to the first folded part 30a, it is possible to deploy the airbag 30 in a balanced manner.

In the above illustrative embodiment, the leading end portion of the second folded part 30b is folded back in the opposite direction to the cabin-side. However, the configuration in which the leading end portion of the second folded part 30b is folded back in the opposite direction to the cabin-side may be omitted. In this case, the operational effect described in the (4) cannot be realized. However, the operational effects described in the (1) to (3) can be realized.

The invention is not limited to the above illustrative embodiment in which the tear line 13 is deviated to the upper side. In other words, the invention can be applied inasmuch as the tear line 13 is provided to a position deviated from the center of the inflator 50. For example, when the tear line 13 is provided at a position deviated toward the lower side, the method of folding the airbag 30 in the above illustrative embodiment may be reversed regarding the upper and lower sides, thereby positioning the second folded part 30b folded in the bellows shape at the upper side.

Not only when the tear line is deviated toward the upper and lower sides, but also when the tear line is deviated toward the left and right sides, the invention can be applied. In other words, when the tear line is provided at a position deviated from the center of the inflator 50 but it is difficult to deploy the airbag 30 in a balanced manner, a part of the airbag 30, which is located at a position at which it is difficult to deploy the part, may be folded in a bellows shape.

In the above illustrative embodiment, the invention has been embodied as the airbag apparatus 100 for a steering. However, the invention is not limited to the airbag apparatus for a steering and can be generally applied to an airbag apparatus in which the case is divided into door shapes along the tear lines formed at the case. For example, the invention can be applied to an airbag for an assistant passenger's seat that is embedded in a dashboard. Meanwhile, in an airbag for an assistant passenger's seat, a dashboard serves as a case that accommodates therein the airbag 30, like the pad 10.

What is claimed is:

1. An airbag apparatus comprising:
an airbag that is folded toward an inflator attaching part so as to narrow a width of the airbag in a lateral direction and thus forms an intermediate shape extending in a longitudinal direction with the inflator attaching part being interposed therebetween, in which parts extending in the longitudinal direction in the intermediate shape are respectively folded toward the inflator attaching part to form a first folded part and a second folded part, and that is accommodated in a case with the first and second folded parts being arranged on a cabin side from the inflator,
wherein the case is provided with a tear line that is formed at a position deviated from a center of the inflator toward the first folded part and divides the case into a first door and a second door, the first door overlapping over both the first and second folded parts, the first door deploying from the second folded part, the first door serving as a first support point for the airbag when inflated, the second door overlapping over the first folded part, the second door deploying from the first folded part, the second door serving as a second support point for the airbag when inflated,
wherein the second folded part is folded in a bellows shape,
wherein the first and second folded parts arranged toward the cabin side of the inflator are partially overlapped between parts forming the first and second doors of the case and the inflator,
wherein the first folded part and the second folded part further are partially overlapped so that a lower surface side of the second folded part is located above an upper surface side of the first folded part, and
wherein the second folded part at the overlapped part is positioned more closely toward the cabin than the first folded part.

2. The airbag apparatus according to claim 1, wherein the airbag is provided therein with a rectification cloth that blocks a flow of gas that is ejected from the inflator toward the first folded part.

3. The airbag apparatus according to claim 1, wherein the airbag apparatus is an airbag apparatus for a steering in which a pad functioning as the case is provided at a center of a steering of a vehicle and the airbag and the inflator are accommodated in the pad, and
wherein the first folded part is provided at an upper side of the second folded part at a state in which the steering is neutral, the tear line formed at the pad is provided to upwardly bypass an emblem that is provided at a center of the steering.

4. The airbag apparatus according to claim 3, wherein a leading end portion of the second folded part folded in a bellows shape is folded back from a lower side in an opposite side to the cabin-side.

5. An airbag apparatus comprising:
an airbag that is folded toward an inflator attaching part so as to narrow a width of the airbag in a lateral direction and thus forms an intermediate shape extending in a longitudinal direction with the inflator attaching part being interposed therebetween, in which parts extending in the longitudinal direction in the intermediate shape are respectively folded toward the inflator attaching part to form a first folded part and a second folded part, and that is accommodated in a case with the first and second folded parts being arranged on a cabin side from the inflator,
wherein the case is provided with a tear line that is formed at a position deviated from a center of the inflator toward the first folded part and divides the case into a first door and a second door, the first door overlapping over both the first and second folded parts, the first door deploying from the second folded part, the first door serving as a first support point for the airbag when inflated, the second door overlapping over the first folded part, the second door deploying from the first folded part, the second door serving as a second support point for the airbag when inflated, and
wherein the second folded part is folded in a bellows shape,
wherein the airbag is provided therein with a rectification cloth that swells into a tubular shape in the airbag by gas ejected from the inflator and introduces the gas into the airbag from both ends thereof, thereby rectifying the gas ejected from the inflator, and
wherein the airbag is folded with the rectification cloth being biased to a part forming the second folded part, and the airbag is accommodated in the case with the rectification cloth being put in the second folded part.

6. The airbag apparatus according to claim 5, wherein the first and second folded parts arranged toward the cabin side of the inflator are partially overlapped between parts forming the first and second doors of the case and the inflator, and wherein the second folded part at the overlapped part is positioned more closely toward the cabin than the first folded part.

7. The airbag apparatus according to claim 5, wherein the airbag is provided therein with the rectification cloth that blocks a flow of gas that is ejected from the inflator toward the first folded part.

8. The airbag apparatus according to claim 5, wherein the airbag apparatus is an airbag apparatus for a steering in which a pad functioning as the case is provided at a center of a steering of a vehicle and the airbag and the inflator are accommodated in the pad, and wherein the first folded part is provided at an upper side of the second folded part at a state in which the steering is neutral, the tear line formed at the pad is provided to upwardly bypass an emblem that is provided at a center of the steering.

9. The airbag apparatus according to claim 8, wherein a leading end portion of the second folded part folded in a bellows shape is folded back from a lower side in an opposite side to the cabin-side.

* * * * *